United States Patent [19]

Dwyer et al.

[11] Patent Number: 5,016,030
[45] Date of Patent: May 14, 1991

[54] APPARATUS FOR MAGNETICALLY READING AND RECORDING ON FILM

[75] Inventors: Patricia A. Dwyer, Rochester; Jeffrey R. Stoneham, Spencerport, both of N.Y.

[73] Assignee: Eastman Kodak Company, Rochester, N.Y.

[21] Appl. No.: 549,257

[22] Filed: Jul. 3, 1990

Related U.S. Application Data

[63] Continuation-in-part of Ser. No. 417,347, Oct. 5, 1989, abandoned.

[51] Int. Cl.⁵ .............................................. B03B 7/00
[52] U.S. Cl. .......................................... 354/21; 354/76; 354/106; 352/92; 352/172; 360/109
[58] Field of Search ................... 354/76, 21, 106; 352/92, 172; 360/3, 104, 105, 109

[56] References Cited

U.S. PATENT DOCUMENTS

| | | | |
|---|---|---|---|
| 4,270,853 | 6/1981 | Hatada et al. | 354/76 |
| 4,270,854 | 6/1981 | Stemme et al. | 354/76 |
| 4,375,071 | 2/1983 | Crowley | 360/109 X |
| 4,613,911 | 9/1988 | Ohta | 360/3 |
| 4,642,717 | 2/1987 | Matsuda et al. | 360/105 |
| 4,843,414 | 6/1989 | Yoshino | 354/21 |
| 4,864,445 | 9/1989 | Tezuka | 360/105 |

*Primary Examiner*—Brian W. Brown
*Attorney, Agent, or Firm*—Roger A. Fields

[57] ABSTRACT

A magnetic head is mounted on a camera film platen which is supported for constrained movement relative to the camera body to maintain a precise relationship between an information track recorded on the film and a film edge. The magnetic head is pivotally mounted on the film platen. Means are provided to establish one angular orientation of the head to establish one angular orientation of the head with respect to the film during prewind to read information recorded by the film manufacturer and a second different angular orientation during transport of the film in the opposite direction during film exposure to record information relating to film exposure. This enables a camera to distinguish between information recorded by the manufacturer and information recorded by a camera to determine if mid-roll interrupt occurred and, if so, the location of the last frame exposed.

12 Claims, 6 Drawing Sheets

APPARATUS FOR MAGNETICALLY READING AND RECORDING ON FILM

This application is a continuation-in-part of application Ser. No. 07/417,347, filed Oct. 5, 1989 now abandoned.

CROSS REFERENCE TO RELATED APPLICATIONS

1. U.S. Ser. No. 282,419, entitled APPARATUS FOR MAGNETICALLY READING AND RECORDING ON FILM, and filed Dec. 9, 1988 in the name of Douglas A. Pearson.

2. U.S. Ser. No. 255,693, entitled FILM INFORMATION EXCHANGE SYSTEM USING DEDICATED MAGNETIC TRACKS ON FILM and filed Oct. 7, 1988, in the name of Robert P. Cloutier et al.

3. U.S. Ser. No. 221,955, entitled MOTOR-DRIVEN FILM TRANSPORT APPARATUS, and filed July 20, 1988 in the name of Donald M. Harvey. U.S. Ser. No. 221,955 is incorporated into this application by reference.

4. U.S. Ser. No. 206,407, entitled, as amended, THREE PART DECODER CIRCUIT, and filed June 14, 1988 in the name of Michael L. Wash.

5. U.S. Ser. No. 206,408, entitled, as amended, THREE PART ENCODER CIRCUIT, and filed June 14, 1988 in the names of Arthur Whitfield and Michael L. Wash.

6. U.S. Ser. No. 206,553, entitled, as amended, THREE PART DECODER CIRCUIT, and filed June 14, 1988 in the name of Arthur Whitfield.

7. U.S. Ser. No. 417,336, entitled CAMERA APPARATUS FOR MAGNETICALLY RECORDING ON FILM, and filed concurrently herewith in the names of Jeffrey R. Stoneham and Patricia D. Fairman.

8. U.S. Ser. No. 417,345, entitled FILM MID ROLL INTERRUPT PROTECTION FOR A CAMERA USING MAGNETIC AZIMUTH RECORDING ON FILM, and filed concurrently herewith in the names of Michael L. Wash, Douglas H. Pearson and Richard R. Kelbe.

BACKGROUND OF THE INVENTION

1. Field of The Invention

This invention relates to magnetic reading and recording apparatus and more specifically to magnetic reading and recording apparatus for photographic equipment.

2. Description of Related Applications

In commonly assigned copending application Ser. No. 417345 filed concurrently herewith by Wash et al. and cross referenced above, there is disclosed a system for recording information on a magnetic coating on photographic film to produce an indication that midroll interrupt occurred. More specifically, it is disclosed that data can be recorded by the film manufacturer on a dedicated track with the head positioned at an angle relative to the film axis. This information can be read during prewind of the film prior to exposure and used to set the camera for film speed, film type, etc. During film exposure, the head can erase information from the dedicated track and simultaneously record with the head positioned perpendicular to the film axis during film advancement. If the film is removed from the camera prior to complete exposure of the film, the mid-roll interrupt exposure position will coincide with the point at which the perpendicularly recorded information terminates and angularly recorded information is still present. By providing appropriate memory, logic and controls in the camera as disclosed in copending application Ser. No. 417345, the camera can be arranged to commence exposure upon reinsertion of the film at the point where angular recording is still present.

SUMMARY OF THE INVENTION

It is an object of the present invention to provide a simple mechanism to position a head in one angular position relative to the longitudinal axis of the film during prewind and in a second angular position relative to said axis during exposure of the film.

In accordance with the invention, a magnetic head is mounted in a piece of photographic equipment such as a camera, film or paper processor or printer for movement between two angular positions. In a first position, the head assumes one angular relationship with the film axis. In the second position the head assumes a different angular relationship with the film axis. Means are provided to cause the head to assume the first Position during film prewind and the second position during film exposure.

BRIEF DESCRIPTION OF THE DRAWINGS

Other objects and advantages of the invention will become apparent from the following description taken in connection with the accompanying drawings wherein.

DETAILED DESCRIPTION OF THE PREFERRED EMBODIMENT

Figure 1:
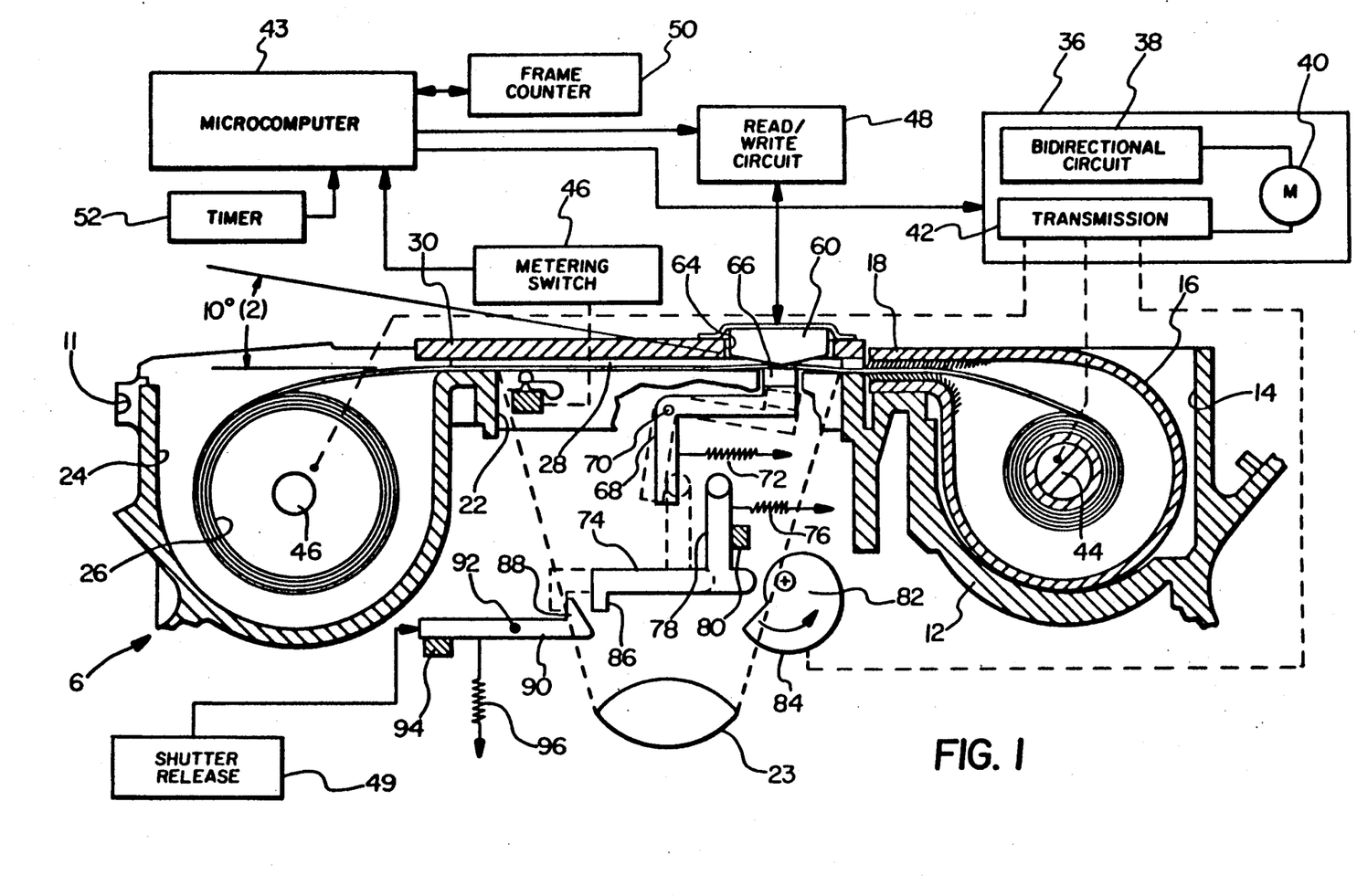
FIG. 1 is a cross section of a portion of a conventional photographic still camera illustrating a magnetic recording apparatus.
Figure 2:
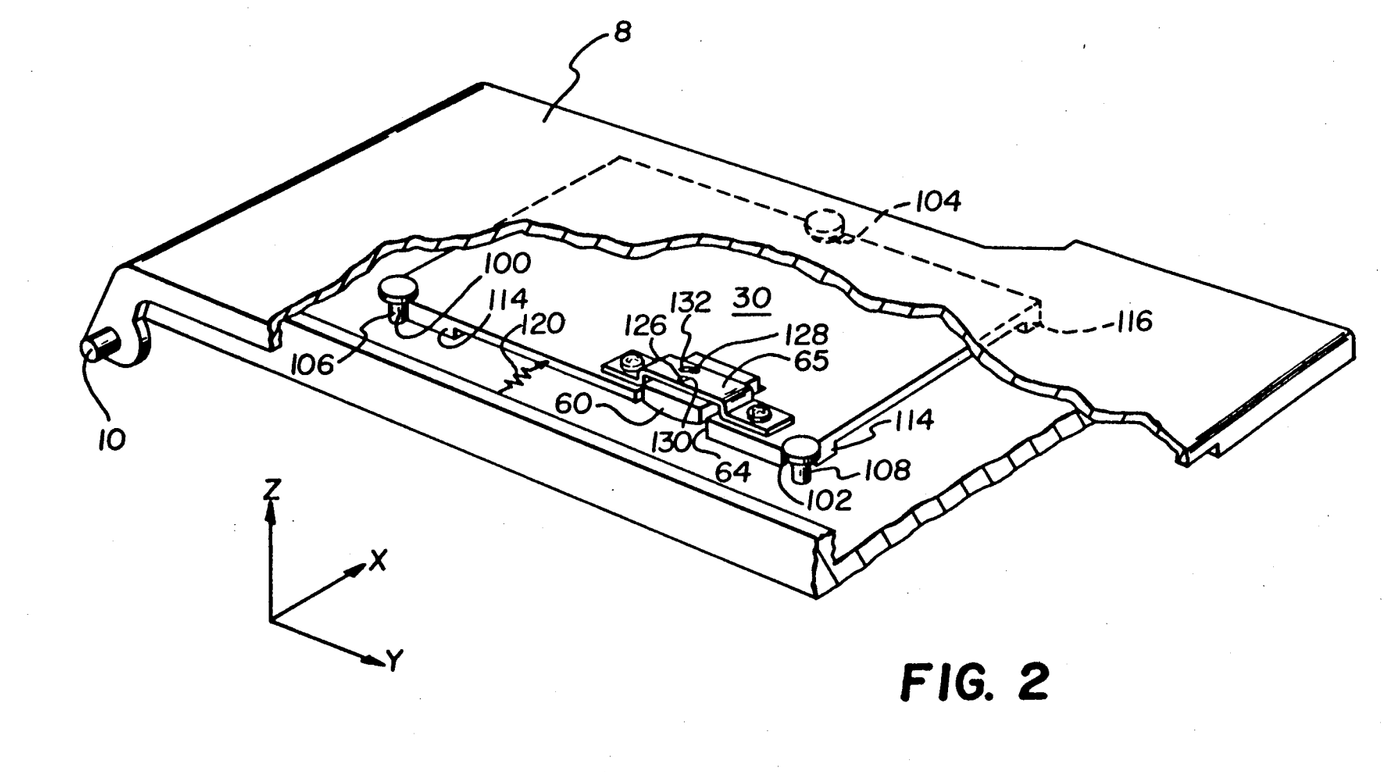
FIG. 2 is a perspective view of the back or door for the camera illustrated in FIG. 1 cut away to illustrate the platen and recording module.
Figure 3:
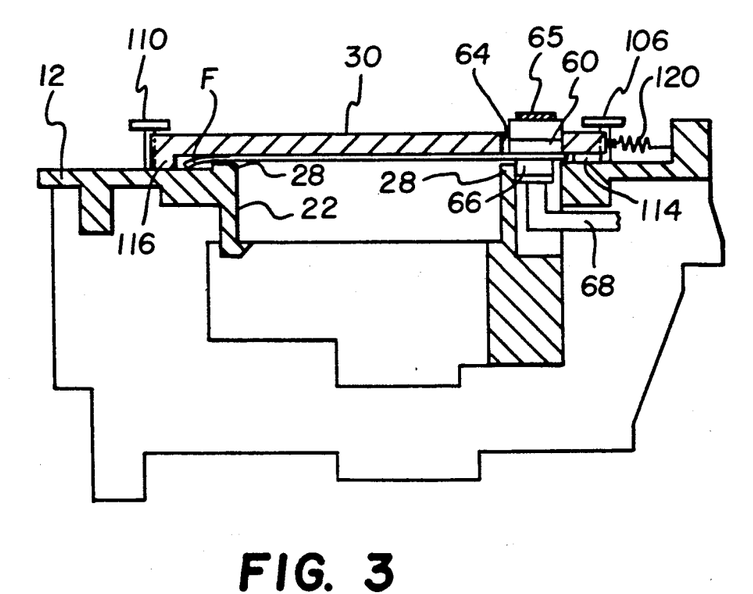
FIG. 3 is a cross section taken perpendicular to the section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 2. The pins 10 are received in holes 11 in frame 12. Since such cameras are well known in the art, features not necessary for an understanding of the present invention have been omitted or shown in block diagram to simplify the disclosure. Also, the invention will be described with reference to a single magnetic head. However, it is to be understood that other types of photographic equipment other than a camera may be used and that a plurality of heads for multi-track recording may be provided therein.

A camera 6 comprises a frame or housing 12 having a chamber 14 at one end thereof for receiving a film cartridge 16. The cartridge 16 which is shown more clearly in FIGS. 4 and 5, preferably takes the form of the film cartridge disclosed in the referenced copending application U.S. Ser. No. 221,955 having a lip 18 from which a film 20 is removed for exposure. The film 20 is provided with a transparent magnetic coating 21 on its non-emulsion side, a single row of perforations (p) along one edge and dedicated longitudinal recording areas (r) along the edges outside the image area (i). As disclosed in copending application Ser. No. 255,693, filed Oct. 7, 1988 in the name of Robert P. Cloutier et al. and entitled FILM INFORMATION EXCHANGE SYSTEM USING DEDICATED MAGNETIC TRACKS ON FILM, the areas (r) may be areas dedicated for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera, such as the commercially available KODAK K-14 Medalist VR 35 camera and other type of photographic apparatus and paper processors or printers.

Figure 4:
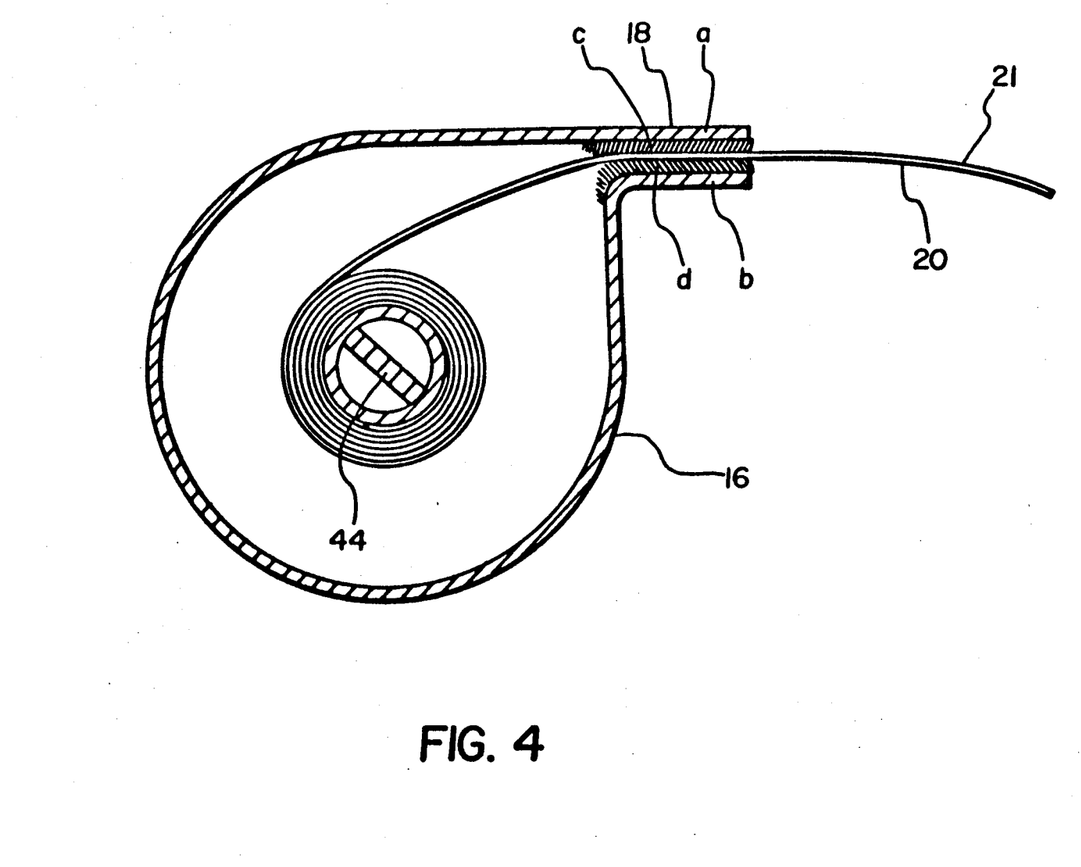
FIG. 4 an enlarged cross section of a film cartridge.
Figure 5:
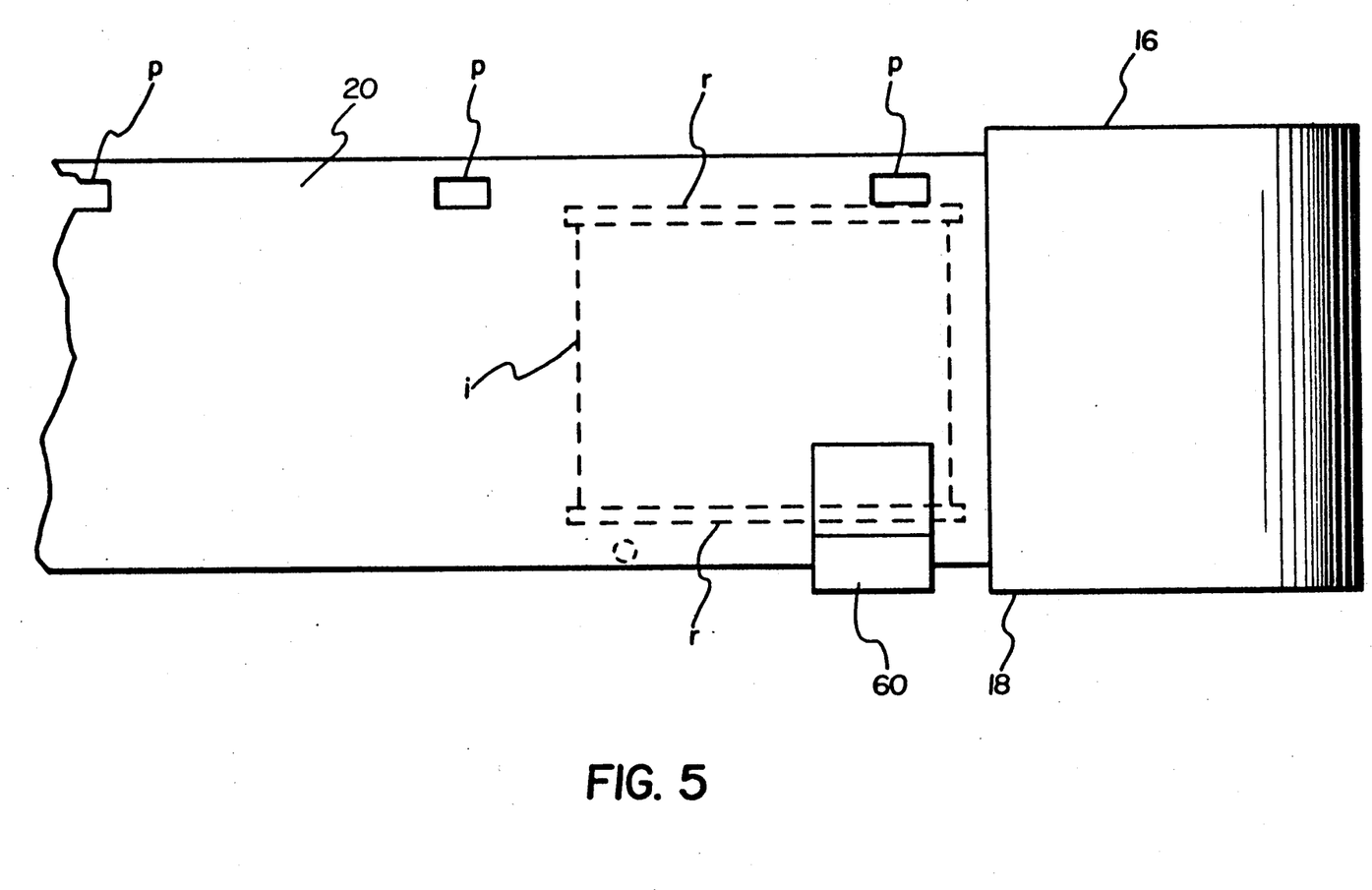
FIG. 5 is an enlarged top view of the film cartridge shown in FIG. 4 with the film partially withdrawn.

As shown in FIG. 4, the lip 18 comprises upper and lower spaced flanges (a) and (b) which serve to clamp upper and lower pieces of plush material (c) and (d) to opposite sides of the film.

As is well known in the art, the surfaces of cartridge 16 and lip 18 engage complemental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26. Mechanisms for accomplishing such film transport are well known in the art. Typically, they operate to advance the film frame by frame from the cartridge to the take-up spool and then to rewind the film into the cartridge after exposure of the last frame. Alternatively, if the camera exposes during rewind, the film will be initially wound on the take-up spool and then advanced frame by frame from the take-up spool to the cartridge.

As shown in FIG. 3, a pair of film rails 28 are formed on opposite sides of the rectangular exposure opening 22 to engage the longitudinal edges of the film. The film 20 is urged toward the rails 28 by a platen 30 mounted on the camera body 8. The platen 30 comprises a flat rectangular plate having planar dimensions complemental to the rectangular exposure opening 22. As described in more detail below, platen 30 is supported on the camera body for slight constrained movement relative to platen support surfaces, whereby it will engage the film 20 and urge it with slight pressure toward rails 28. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas F but not enough to noticeably degrade the image.

In a typical still camera, the spacing between the platen 30 and the rails 28 is in the range of 0.25-0.45 mm as a result of manufacturing tolerances. The photographic film used in such a camera is typically 0.15 mm thick. Accordingly, as shown in FIG. 3, the film maY not actually engage the rails. Due to the transverse film curl, the extreme edges of the film may actually engage the camera surfaces on the other side of the rails 28 with the curl bias F causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 46 which engage the core of film cartridge 16 and the take-uP spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism 49, a conventional digital frame counter 50 and a conventional timer 52. These components are all controlled from the micro computer 43 in a manner well known in the art and since they form no part of the Present invention, further description is deemed unnecessary.

Magnetic recording in photographic still cameras involves unique problems. Film advance occurs in a short period of time with a limited amount of motion and does not allow the steady conditions normally associated with magnetic recording to be achieved. In view of these problems, the read/write circuit 48 preferably utilizes the encoding and decoding techniques disclosed in the referenced commonly assigned copending applications U.S. Ser. Nos. 206,407, 206,408 and 206,553, and the code format may take the form of that disclosed in the referenced copending application Ser. No. 206,646.

A conventional rectangular shaped magnetic read/-write head 60 having a V-shaped bottom or curved surface is connected to the read/write circuit 48. The head is retained in an opening 64 in platen 30 by a bracket 65 and is positioned so that the head will engage the transparent magnetic coating of the film in the region adjacent the lip 18 of cartridge 16. The position of head 60 is adjusted so that the head will maintain slight contact (i.e. within 10 micro-inches) with the magnetic coating of film 20.

A compliant circular pressure pad 66 formed from resilient material and carried by a pivotal lever 68 is positioned below the magnetic head 60 and on the opposite side of the film from the head. The lever 68 is mounted on a Pin 70 and biased counterclockwise by a spring 72 toward the Position shown in solid lines to thus urge pressure pad 66 into engagement with film 20 with a bias force of 14-56 grams. A second lever 74 biased to the right by a spring 76 is mounted on the camera body for rectilinear movement. The lever 74 has an arm 78 which engages a stop 80 under the influence of spring 76. A cam 82 driven by the transmission 42 has a cam rise 84 which upon rotation of the cam 82 will engage lever 74 and displace it to the left to the position shown in dashed lines. During such movement, the arm 78 will engage and pivot lever 68 clockwise against the bias of spring 72. During such movement, the angled end 86 of lever 74 will move by the latch portion 88 of a pivotal lever 90 mounted on a pin 92 and biased into engagement with a stop 94 by a spring 96. The angled end 86 of the lever 74 will become latched in the position shown in broken lines and the lever 68 will be held in the position shown in dashed lines to hold pad 66 away from the film. The lever 90 can be subsequently rotated clockwise against the bias of spring 96 to release the lever 74 to permit the parts to return to the positions shown in solid lines.

In operation of the pressure pad and associated mechanism, the lever 68 will assume the position shown in solid lines to hold the pressure pad 66 into engagement with the film to urge the film into contact with the head 60 while the film is in motion. Near the end of advance of a film frame, rise 84 of cam 82 will engage lever 74 and displace it to the left until its angled end 86 is latched by latch 88. The parts will assume the positions shown in dotted lines and the pad 66 will now be displaced from the film. At the end of the film exposure frame, the shutter release mechanism will actuate lever 90 to release lever 74 so that the parts will again assume the position shown in solid lines during advancement of the next frame to an exposure position. The pad 66 is thus held into engagement with the film during film advancement to assure adequate magnetic coupling between the head and magnetic coating and released during film exposure to prevent distortion of the film plane. The apparatus thus achieves reliable recording in a photographic still camera without affecting image quality.

Referring to FIG. 2, the magnetic head and platen arrangement may take the form disclosed in our concurrently filed copending application Ser. No. 417,336 cross referenced above. More specifically, the platen 30 is provided with three curved recesses 100, 102 and 104 into which extend three pins 106, 108 and 110 fixed to the camera body. The pins 106, 108, 110 may be formed integrally with the camera body or may comprise separate parts threaded into the camera body.

As will be apparent from FIG. 2, recesses 100 and 108 are located in the corner portions of one side of the platen 30 while recess 104 is located at substantially the midpoint of the opposite side of the platen. Each pin is provided with a flat head or flange which extends slightly over the upper surface of the platen. With this arrangement, the upstanding portions of the pins 106, 108 and 110 constrain the platen in the X and Y directions and the head portions of the pins restrain the platen in the Z direction as indicated by the arrows in FIG. 2. By providing slight clearances between the platen and the pins, the platen will "float" within the constraints of the pins and maintain the desired film flatness.

The platen 30 is provided with a pair of spaced guide shoes 114 on its bottom surface along one edge and a guide rib 116 along the opposite edge. The shoes 114 are provided for riding on the edge of the film and for controlling the distance between the film edge and the magnetic head gap and their spacing defines a "pivot length" for the film. The guide 116, in conjunction with the guide shoes 114 on the opposing side of the platen, restricts the maximum amount of skew the film strip can have with respect to the Platen and, therefore, the magnetic head which is rigidly mounted by the platen. By controlling the dimension and tolerances of the pivot length and the length from the guide to the shoes, the maximum skew of the film can be restricted to 1.35 degrees. By controlling the skew to 1.35 degrees or less, the maximum signal loss that can be induced by the skew (also called azimuth error) can be limited to 25%. A signal loss of 25% or less is a viable magnetic read/write system. The significance of this is that no extra parts are needed, such as springs, to follow the film edge and control the azimuth error. This would allow any roll of film which had been partially exposed in an inexpensive magnetic recording camera designed to read and/or record on one or two tracks to be interrupted mid-roll and loaded into any other magnetic camera and be properly read magnetically provided the magnetic data was written and read at substantially the same rate.

As disclosed in our concurrently filed copending application Ser. No. 417,336, a spring 120 may be mounted between the edge of the platen 30 and a fixed surface of the camera body to urge the shoes 114 into engagement with the film edge. With this arrangement, the spring will insure the proper orientation of the head with respect to the film edge because the shoes 114 will follow the film edge and maintain the skew to a minimum. This embodiment has particular utility in a sophisticated camera where as many as three information tracks are utilized.

In accordance with the invention, the head 60 is provided with a pair of pins 126 and 128 extending upward from its upper surface. One pin 126 is received in a complemental circular bore 130 in bracket 65 while the pin 128 is received in a slot 132 in the bracket 65. With this arrangement, pin 126 and opening 130 define a pivot point for the head 60 and the confines of slot 132 determine the range of pivotal movement of the head. When the pin 128 engages the left end of slot 132 as viewed in FIG. 6, the head gap will be positioned substantially perpendicular to the film axis. When it engages the right end of the slot as viewed in FIG. 6, it will be positioned at a slight angle to the film axis.

Figure 6:
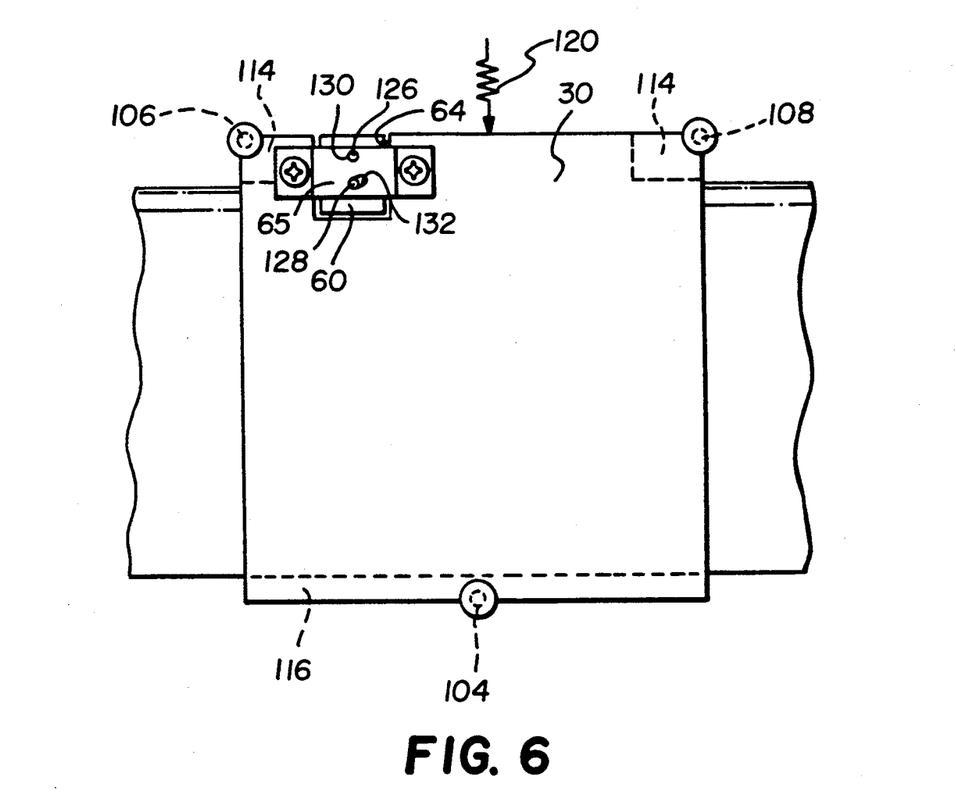
FIG. 6 is a top view of the film platen and recording module.

During prewind, the film is moved to the right as viewed in FIG. 6. During prewind, the slight frictional contact that exists between the film and head caused by the pressure pad 66, will urge the head to pivot clockwise as viewed in FIG. 6 and cause the pin 128 to engage the right end of the slot 132 and cause the head to be positioned at a slight angle relative to the longitudinal axis of the film. During film exposure, the frictional forces will cause the head to pivot to its perpendicular position wherein the pin 128 engages the left end of the slot 132 as viewed in FIG. 6.

In operation, the information initially recorded by the manufacturer at an angle will be read by the head 60 during prewind of the film onto the take-up spool 26. During such prewind the head 60 will be positioned at an angle relative to the longitudinal axis of the film by the functional force exerted by the pressure pad 66. During film exposure, the head 66 will be positioned perpendicular to the longitudinal axis of the film to erase information recorded bY the manufacturer and to record information relating to film exposure. If the cartridge is removed from the camera before exposure of all of the frames and reinserted into the same camera or a similar camera having the same recording capability, the last frame exposed can be located by identifying the interface between the end of the Perpendicularly recorded information and the unerased angular recorded information as disclosed in commonly assigned application Ser. No. 417,234 filed concurrently herewith.

It will now be apparent that the invention provides a simple reliable means for positioning a head in one position relative to a film axis when the film is moved in one direction and in a second position when the film is moved in the opposite direction.

While the invention has been shown and described with reference to a preferred embodiment within a still camera the invention may be used in other types of photographic equipment where magnetic reading and recording is desirable (i.e., film and paper processors, printers, etc.) and that, it will be apparent that various changes may be made without departing from the scope of the invention as defined by the appended claims.

We claim:

1. In a photographic apparatus including a body having an exposure opening, a magnetic read/write head, and means for transporting a photographic film over the exposure opening to expose frames of a film, the film having a magnetic surface for magnetically reading and recording information on the film, said camera apparatus comprising:

means for supporting the magnetic read/write head in the apparatus; and means for causing the head to assume one angular position relative to the film during movement of the film during movement of the film in one direction and a second angular position relative to the film in an opposite direction.

2. The photographic apparatus as claimed in claim 1 wherein said means for causing said head to assume said first and second angular Positions includes means for pivoting said head and means for limiting pivotal movement of said head to pivotal movement between said one and said second angular positions.

3. The photographic apparatus as claimed in claim 2 wherein said head is positioned at an angle to the film in said one position and substantially Perpendicular to said film in said second position.

4. The photographic apparatus having an exposure opening and further as claimed in claim 3 wherein said apparatus comprise a camera having an exposure opening and further includes film take-up means for prewinding said film onto a film take-up and means for transporting the film across the exposure opening during film exposure, said head being positioned at said angle during prewind and substantially perpendicular to the film during film exposure.

5. The photographic apparatus of claim 3 wherein said supporting means pivotally supports said head for pivotal movement between said first and second positions.

6. The photographic apparatus of claim 5 wherein said supporting means comprises:

a bracket having a slot and a circular opening spaced from said slot; and a pair of pins extending from said head and received by said slot and opening, respectively, said head being pivotal about the pin received by the circular opening with the ends of said slot establishing said first and second positions.

7. The photographic apparatus of claim 3 wherein said head is pivotally mounted on said platen wherein the frictional contact of the head with the film causes said head to assume said positions.

8. A photographic still camera including a camera body having an exposure opening a magnetic head, means for transporting film having a magnetic surface over the exposure opening to expose frames of the film, and a film platen for retaining the film in an exposure plane, said camera comprising:

means for supporting the magnetic head on the film platen to contact the film magnetic surface; and means for causing the head to assume one angular position relative to the film during movement of the film in one direction relative to the exposure opening and in a second angular position relative to the film during movement of the film in an opposite direction.

9. The photographic still camera as claimed in claim 8 wherein said head is pivotally mounted on said platen wherein the frictional contact of the head with the film causes said head to assume said positions.

10. A photographic still camera including a camera body having an exposure opening, a magnetic read/write head means for transporting film having a magnetic surface over the exposure opening to expose frames of the film, a film platen for retaining the film in an exposure plane, and means for prewinding the film onto a film take-up, said camera comprising:

means for supporting the magnetic read/write head on the film platen to contact the magnetic surface of the film; and means for causing the head to assume a first angular position relative to the film during film prewind and a second angular position during film exposure.

11. The photographic still camera claimed in claim 10 wherein said supporting means pivotallY supports said head for pivotal movement between said first and second positions.

12. The photographic still camera claimed in claim 11 wherein said supporting means comprises:

a bracket having a slot and a circular opening spaced from said slot; and a pair of pins extending from said head and received by said slot and opening, respectively, said head being pivotal about the pin received by the circular opening with the ends of said slot establishing said first and second positions.

* * * * *